US011507186B2

(12) United States Patent
Marcolino Quintao Severgnini et al.

(10) Patent No.: US 11,507,186 B2
(45) Date of Patent: Nov. 22, 2022

(54) LIQUID CRYSTAL ELASTOMER-BASED TOUCHPAD SYSTEMS AND METHODS WITH RICH HAPTIC FEEDBACK FOR PRECISION OPERATION

(71) Applicant: TOYOTA MOTOR ENGINEERING & MANUFACTURING NORTH AMERICA, INC., Plano, TX (US)

(72) Inventors: Frederico Marcolino Quintao Severgnini, Ann Arbor, MI (US); Ercan Mehmet Dede, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 175 days.

(21) Appl. No.: 16/683,547

(22) Filed: Nov. 14, 2019

(65) Prior Publication Data
US 2021/0149489 A1 May 20, 2021

(51) Int. Cl.
*G06F 3/01* (2006.01)
*G06F 3/044* (2006.01)

(52) U.S. Cl.
CPC ............ *G06F 3/016* (2013.01); *G06F 3/0447* (2019.05)

(58) Field of Classification Search
CPC .... G06F 3/016; G06F 3/0447; G06F 3/04886; G06F 2203/04809; G06F 1/1652; G06F 3/041; G06F 3/0412; G06F 3/0414; G06F 2203/04102; G06F 1/1626; G06F 1/1637; G06F 1/1686; G06F 1/1688; G06F 1/169; G06F 1/1698; G06F 3/011; G06F 3/042; G06F 3/044; G06F 2203/04101; B60K 37/02; G02B 27/01; G02B 2027/0138; G02B 2027/014; G09G 3/3208; G09G 2360/144; H01L 27/3227; H01L 27/323;
(Continued)

(56) References Cited

U.S. PATENT DOCUMENTS 9,274,562 B2 * 3/2016 Franklin ............. H01M 50/463
9,336,688 B2 * 5/2016 Karasin ................ G09B 21/004
(Continued)

FOREIGN PATENT DOCUMENTS

JP        2011244566       12/2011
WO       2011075390        6/2011
(Continued)

OTHER PUBLICATIONS

Wang et al., "Deployable Soft Composite Structures," Scientific Reports (2016), pp. 1-10.

*Primary Examiner* — Nelson M Rosario
(74) *Attorney, Agent, or Firm* — Sheppard, Mullin, Richter & Hampton LLP; Hector A. Agdeppa; Daniel N. Yannuzzi

(57) ABSTRACT

A touchpad for use in an infotainment system and a method of use is provided. The touchpad comprises a bottom layer comprising processing circuitry configured to control operation of a plurality of tactile pixels. The tactile pixels are disposed in a tactile pixel layer on top of the bottom layer. Each tactile pixel comprises a top plate having a plurality of vertices and a support strut coupled to each vertex, each strut comprising a liquid crystal elastomer (LCE) hinge disposed between a first rigid portion and a second rigid portion.

20 Claims, 10 Drawing Sheets

(58) Field of Classification Search
CPC .. H01L 51/0097; H04R 1/028; H04R 2499/15
See application file for complete search history.

(56) References Cited

U.S. PATENT DOCUMENTS

| | | | |
|---|---|---|---|
| 2011/0199321 A1* | 8/2011 | Kyung | G06F 3/041 |
| | | | 345/173 |
| 2017/0256144 A1 | 9/2017 | Khoshkava | |
| 2018/0066636 A1* | 3/2018 | Khoshkava | G06F 3/016 |
| 2018/0081441 A1* | 3/2018 | Redder | G06F 3/04164 |
| 2018/0268232 A1* | 9/2018 | Kim | G06K 9/00013 |

FOREIGN PATENT DOCUMENTS

| | | |
|---|---|---|
| WO | 2016093432 | 6/2016 |
| WO | 2017214469 | 12/2017 |

\* cited by examiner

700C

LIQUID CRYSTAL ELASTOMER-BASED TOUCHPAD SYSTEMS AND METHODS WITH RICH HAPTIC FEEDBACK FOR PRECISION OPERATION

TECHNICAL FIELD

The present disclosure relates generally to touchpad technology, and in particular, some implementations may relate to liquid crystal elastomers and compliant mechanisms implemented within vehicle touchpad devices.

DESCRIPTION OF RELATED ART

Elastomers are polymers with viscosity and elasticity (i.e., viscoelasticity), with properties allowing considerable molecular reconformation without breaking the covalent bonds holding the atoms together. Because of these properties, elastomers can be used to create structures that change shape by the application of fluidic force, heat, electricity, and/or magnetism, among other stressors. When such external force is applied to put the elastomer under stress, the molecules of the elastomer rearrange into an intended shape. Soft robotics, the construction of robots and other devices out of highly compliant materials, is one field in which elastomers are well-suited, given the compliant-nature of elastomers.

BRIEF SUMMARY OF THE DISCLOSURE

According to various embodiments of the disclosed technology, a touchpad apparatus for use in vehicles is provided. The touchpad apparatus comprises a bottom layer comprising processing circuitry; a tactile pixel layer disposed on top of the bottom layer, the tactile pixel layer comprising a plurality of tactile pixels, wherein the processing circuitry is configured to control operation of the plurality of tactile pixels through application of one or more stimuli to each tactile pixel and each tactile pixel is independently operable; and a surface layer disposed on top of the tactile pixel layer, the surface layer comprising a deformable material. Each tactile pixel comprises a top plate comprising a plurality of vertices and a support strut coupled to each vertex of the plurality of vertices, each support strut comprising a liquid crystal elastomer (LCE) hinge disposed between a first rigid portion and a second rigid portion.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
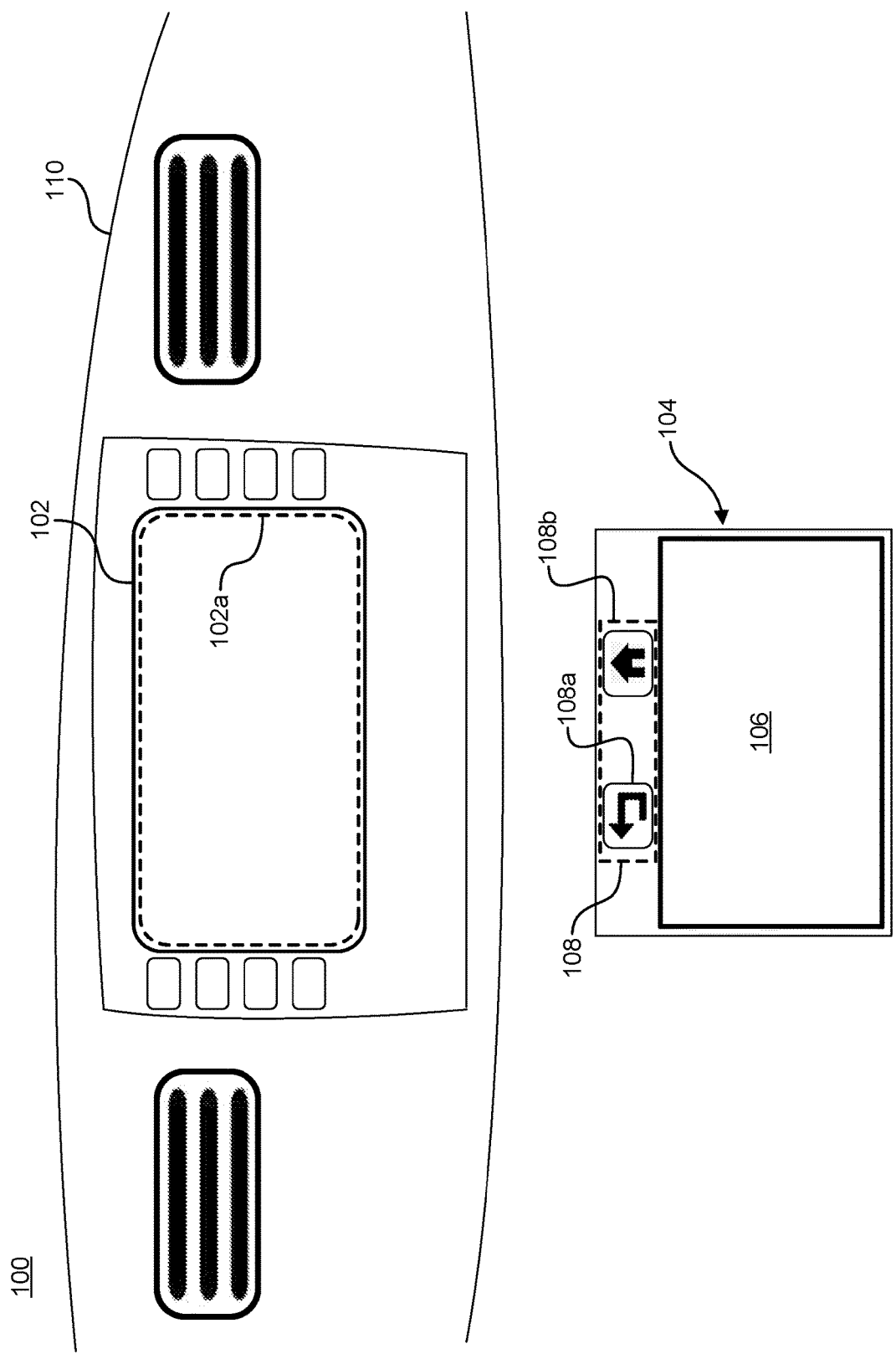
FIG. 1 illustrates an example vehicle infotainment system in accordance with embodiments of the technology disclosed herein.

The figures are not exhaustive and do not limit the present disclosure to the precise form disclosed.

DETAILED DESCRIPTION

Touchpads (also referred to as trackpads) are pointing devices commonly used in laptops and other computing devices. Generally, touchpads comprise a specialized surface that translates the motion and position of a person's finger to a relative position on a screen or display, substituting the need for an external pointing device such as a mouse. Using the touchpad, a person is capable of manipulating the display and selecting icons. Some prior art implementations utilize elastomers (e.g., electroactive polymer structures) to provide tactile feedback to the user, indicating that an icon has been selected, or to define regions (e.g., keyboard keys, usable touchpad surface) configured to accept user input.

However, current touchpad technologies fail to provide the level of precision necessary for a person to select a desired icon in an easier manner. This is especially important for touchpad implementations where the person's attention may be required elsewhere, such as when operating a moving vehicle, or where the amount of real estate available for the touchpad surface is limited. In such instances, selecting the desired icon may become more difficult, especially where there are multiple icons in a similar region of the screen. Where a smaller touchpad is used compared to the size of the display, the relative translation of position may not be precise enough such that a person can tell that the desired icon is selected based on the feedback provided by the touch pad.

Embodiments of the technology presented herein provides a touchpad device which addresses these drawbacks of current touchpad technology. As discussed in greater detail below, embodiments of the technology of the present disclosure provide a liquid crystal elastomer-based touchpad device configured to provide a richer haptic feel enabling more precision in the icon selection process. A deformable touchpad surface encloses an elastomer actuation region comprising a plurality of liquid crystal elastomer (LCE) structures. Different types of LCE structures may be combined in various embodiments to provide different types of haptic feedback and/or surface deformations. By varying the location and level of stimuli to one or more LCE structures, various shapes can be dynamically created in the deformable touchpad surface such that the user can differentiate through feeling different icons. Unlike some current touchpad technologies that rely on defined regions of deformability (e.g., specific defined shapes and locations of keys representing a keyboard), various embodiments of the present technology enable truly dynamic generation of shapes to represent different shapes in the same position (e.g., different icons when swiping between different screens of an operating system). In various embodiments, additional tactile feedback devices may be included to provide indications of selection to the user, as well as additional functionality to modify the shape of the touchpad surface to account for differences in human anatomy.

FIG. 1 illustrates an example vehicle infotainment system 100, comprising a display 102 and a touchpad 104, in accordance with embodiments of the technology disclosed herein. System 100 is provided for illustrative purposes only and should not be interpreted as limiting the scope of the technology to only the illustrated embodiment. In various embodiments, the shape and/or placement of the display 102 and/or touchpad 104 may be different, and a person of ordinary skill in the art would understand that the specific placement of the display 102 and/or touchpad 104 is not limited to only the illustrated embodiment. For ease of discussion, the technology shall be discussed with respect to the example vehicle infotainment system 100 of FIG. 1, but this illustrative embodiment should not be interpreted as limiting the scope of the technology to only vehicle-based implementations. A person of ordinary skill in the art would appreciate based on the present disclosure that the technology disclosed herein is applicable in a variety of different implementations beyond use in an automotive vehicle. Non-limiting examples include input devices for laptops, tablets, ATMs, and other devices and systems with which users may interact. In some embodiments, the technology disclosed herein can be implemented within touchscreens and other touch-sensitive displays to provide greater haptic interaction. Nothing in this disclosure should be interpreted as limiting the scope of the technology to the illustrated embodiments.

As shown in FIG. 1, the infotainment system 100 includes a display 102 installed within a dash 110. In various embodiments, the display 102 may be configured to enable a person within the vehicle to control a number of different vehicle systems. Infotainment system 100 may be configured to display one or more visual icons for a given vehicle system in different sections of the display 102 in some embodiments, wherein the display 102 may be partitioned into different sections. In various embodiments, infotainment system 100 may be configured such that the controls for a selected vehicle system are presented to the user on the display 102 at a time.

As a non-limiting example, the display 102 may be split into four quadrants, with each quadrant capable of displaying information related to a selected vehicle system (e.g., radio, navigation, climate control, etc.). Within each quadrant, a plurality of visual icons (not shown in FIG. 1) can be displayed that can be selected and/or controlled by a user. In various embodiments, the visual icons may be one or more of buttons, toggles, switches, dials, sliders, or other virtual representations of physical controls known in the art to control various vehicle systems. Each quadrant of the display 102 may also display information related to the operation of the relevant vehicle system (e.g., current station playing on the radio). In some embodiments, activation of one or more visual icons may cause a change to occur in the kind, number, and/or type of visual icons and/or information presented on the display 102. As discussed in greater detail below, the change in the visual presentation may be reflected in the physical deformation of the touchpad 104.

The touchpad 104 can be configured as a user interface, allowing a person within the vehicle to interact with the infotainment system 100 and the visual icons presented on the display 102. The touchpad 104 can comprise one or more types of touch-sensitive materials, such as those known in the art for use in prior art touchpads and/or touch surfaces. In various embodiments, the entire touchpad 104 may be covered in one or more types of touch-sensitive material, while in other embodiments one or more portions of the touchpad 104 may comprise non-touch-sensitive material. Either material (i.e., touch-sensitive or non-touch-sensitive) can be deformable to enable the touchpad 104 to change its shape as discussed in greater detail with respect to FIGS. 2-7. In various embodiments, the touchpad 104 may be disposed in or on a center console, and armrest, or other surface of the interior of the vehicle that a user can reach during operation. In some embodiments, a plurality of touchpads 104 may be disposed within a vehicle interior such that multiple users in different positions within the vehicle can control the infotainment system 100.

As shown in FIG. 1, the example touchpad 104 may include a translation region 106. The translation region 106 can comprise a designated portion of the touchpad 104 configured to provide a scaled representation of the interactive area 102a of the display 102 and to translate a user's inputs. The interactive area 102a of the display 102 is generally larger than the total area of a touchpad 104. By scaling the interactive area 102a, the translation region 106 is capable of detecting where in the interactive area 102a a user's finger would be located if the user had touched the display 102 directly. As a non-limiting example, assume that the user's finger is represented on the display 102 as a cursor or other visual pointer. In such embodiments, the translation region 106 can be configured to translate that motion so that the cursor on the display 102 also swipes across from one side of the interactive area 102a to the other without the need for the user to lift up his or her finger and readjust.

Figure 2:
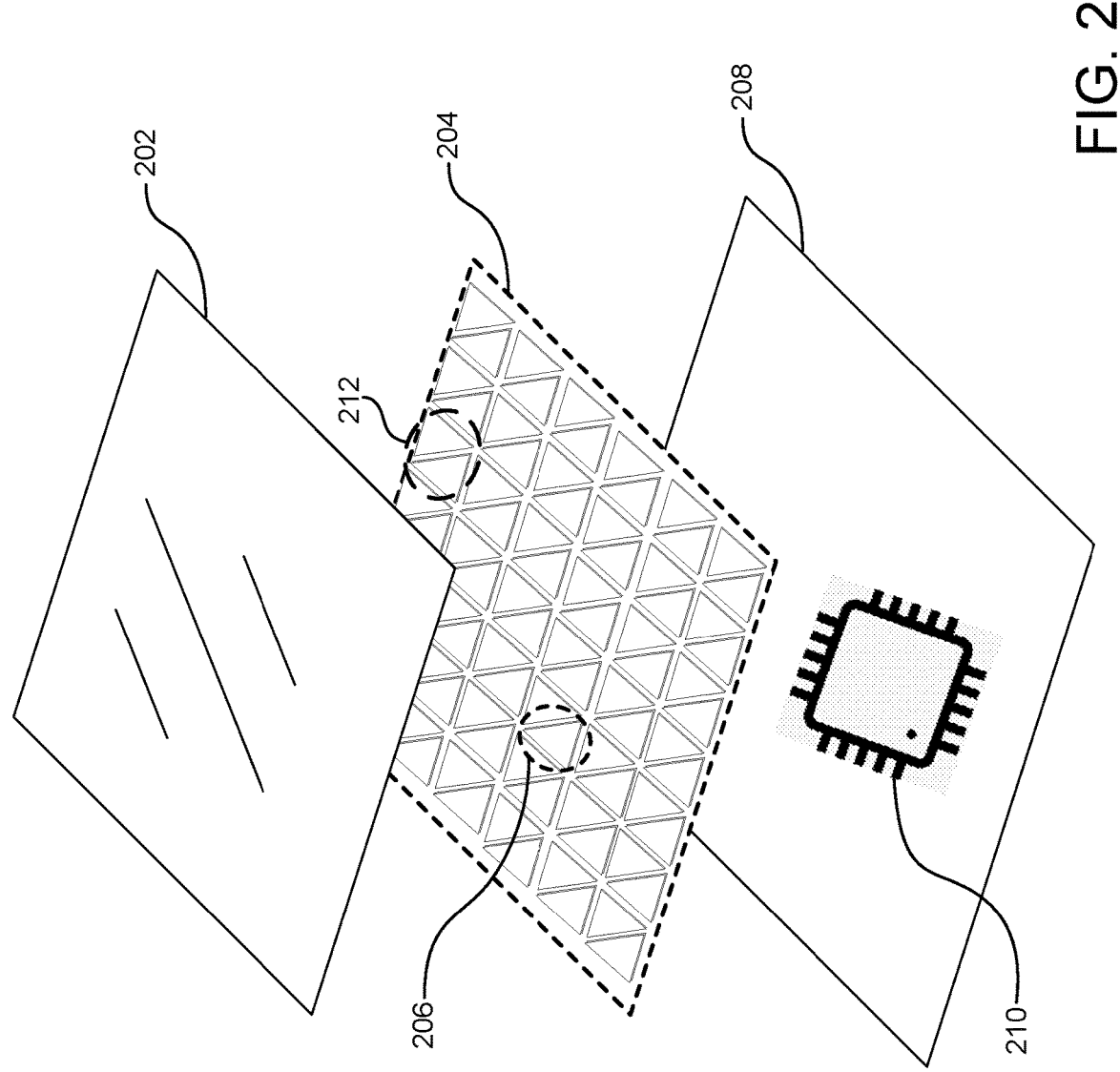
FIG. 2 illustrates exploded view of the example touchpad of FIG. 1 in accordance with embodiments of the technology disclosed herein.
Figure 6:
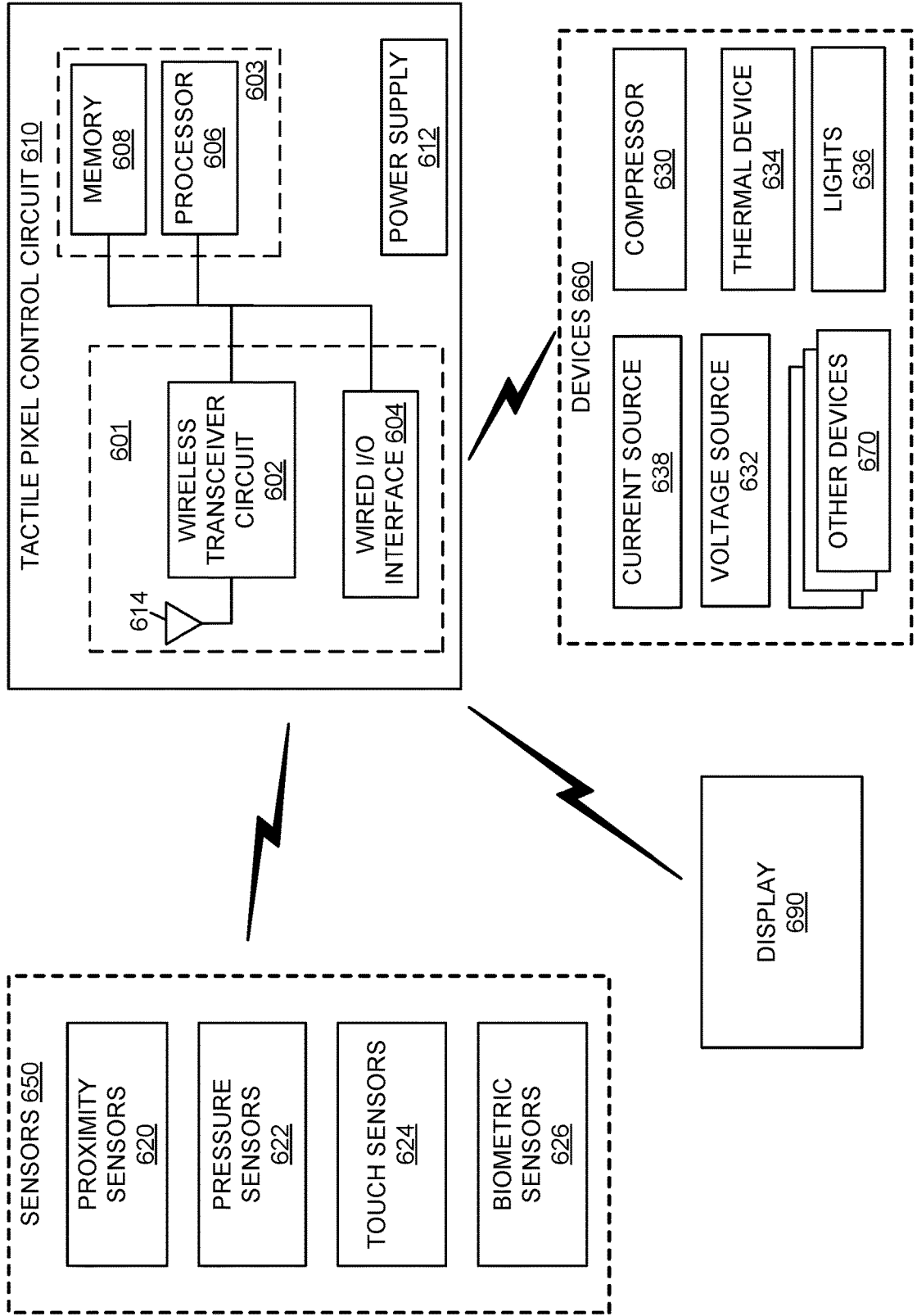
FIG. 6 is an example architecture for operating a touchpad system in accordance with embodiments of the technology disclosed herein.
Figure 8:
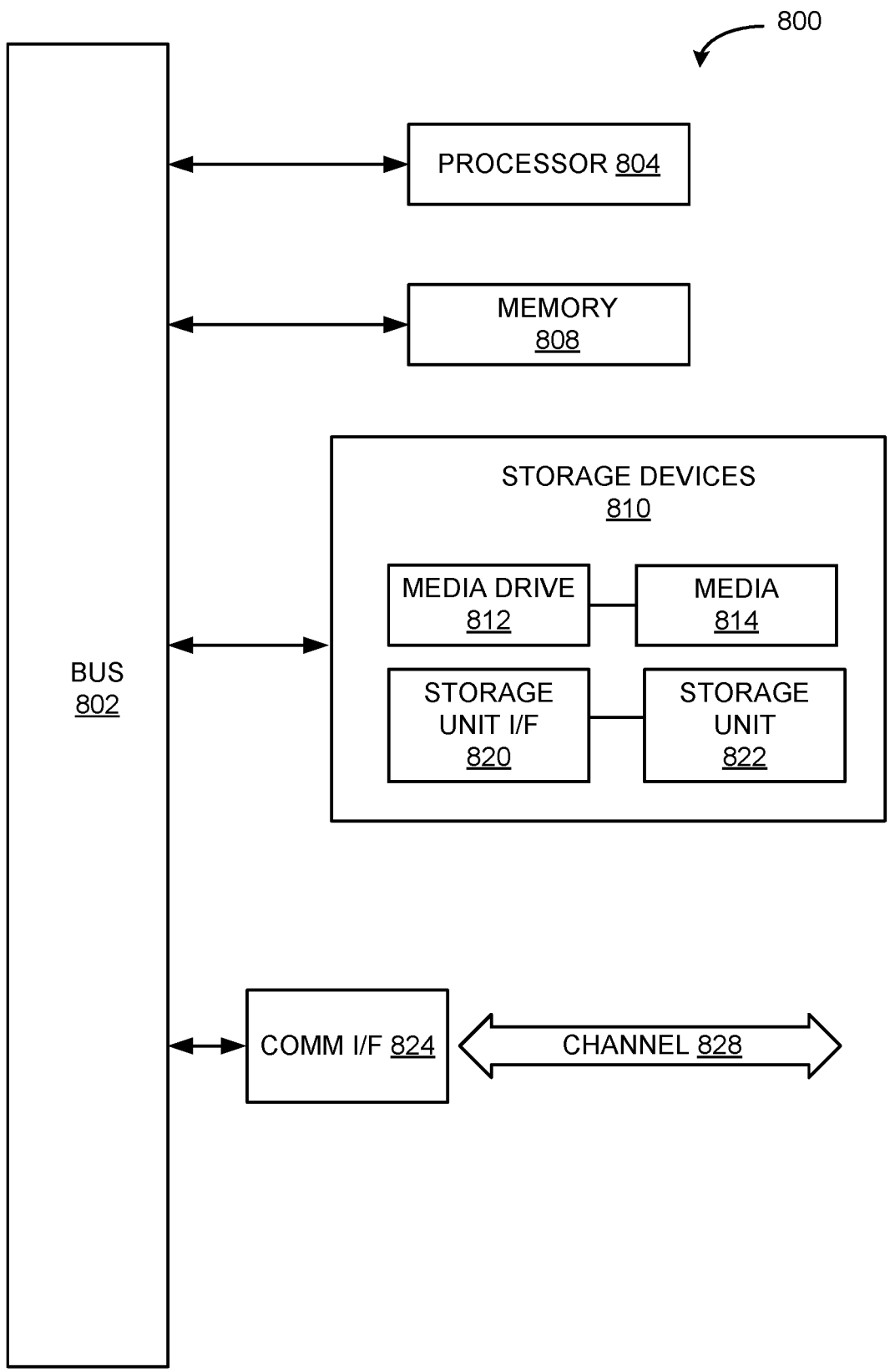
FIG. 8 is an example computing component that may be used to implement various features of embodiments described in the present disclosure.

Scaling the user's actions in the translation region 106 to the interactive area 102a of the display 102 can be performed in real-time by one or more processors or processor circuits of the infotainment system 100, such as the processor circuits discussed in greater detail with respect to FIGS. 2, 6, and 8.

In various embodiments, touchpad 104 can include a hard control region 108, as shown in FIG. 1. The hard control region 108 can comprise one or more controls that are independent of the visual icons presented in the interactive region 102a of the display 102. The controls within the hard control region 108 can be dedicated controls unassociated with a specific vehicle system, such as control to return the display 102 to a dedicated home screen, and/or controls that are common between vehicle systems, such as a "back" control used to revert to a previous screen associated with a vehicle system or to undo a user action. In the illustrated example of FIG. 1, the hard control region 108 includes two hard controls, a "back" control 108a and a "home" control 108*b*. In various embodiments, the hard control region 108 can comprise a touch-sensitive material, while in other embodiments the hard control region 108 may comprise a non-touch-sensitive material.

FIG. 2 is an exploded view of the example touchpad 104 in accordance with embodiments of the present disclosure. As shown in FIG. 2, the touchpad 104 comprises a surface layer 202, a tactile pixel layer 204, and a bottom layer 208. The surface layer 202 comprises the top most layer of the touchpad 104. In various embodiments, the surface layer 202 may comprise a touch-sensitive material, a non-touch-sensitive material, or a combination of both. The surface layer 202 is deformable, allowing the touchpad 104 to change its physical shape based on changes in the visual presentation of the display 102 and/or the specific anatomy of the user.

The touchpad 104 further includes a tactile pixel layer 204, comprising a plurality of tactile pixels 206. Tactile pixels 206 are structures configured to be deformable into a variety of different configurations based on the application of one or more types of stimuli. When placed in a matrix, such as the tactile pixel layer 204, a plurality of tactile pixels 206 can work together to form a variety of different shapes. In the illustrated embodiment of FIG. 2, each tactile pixel 206 is represented in a triangular form factor.

Figure 3:
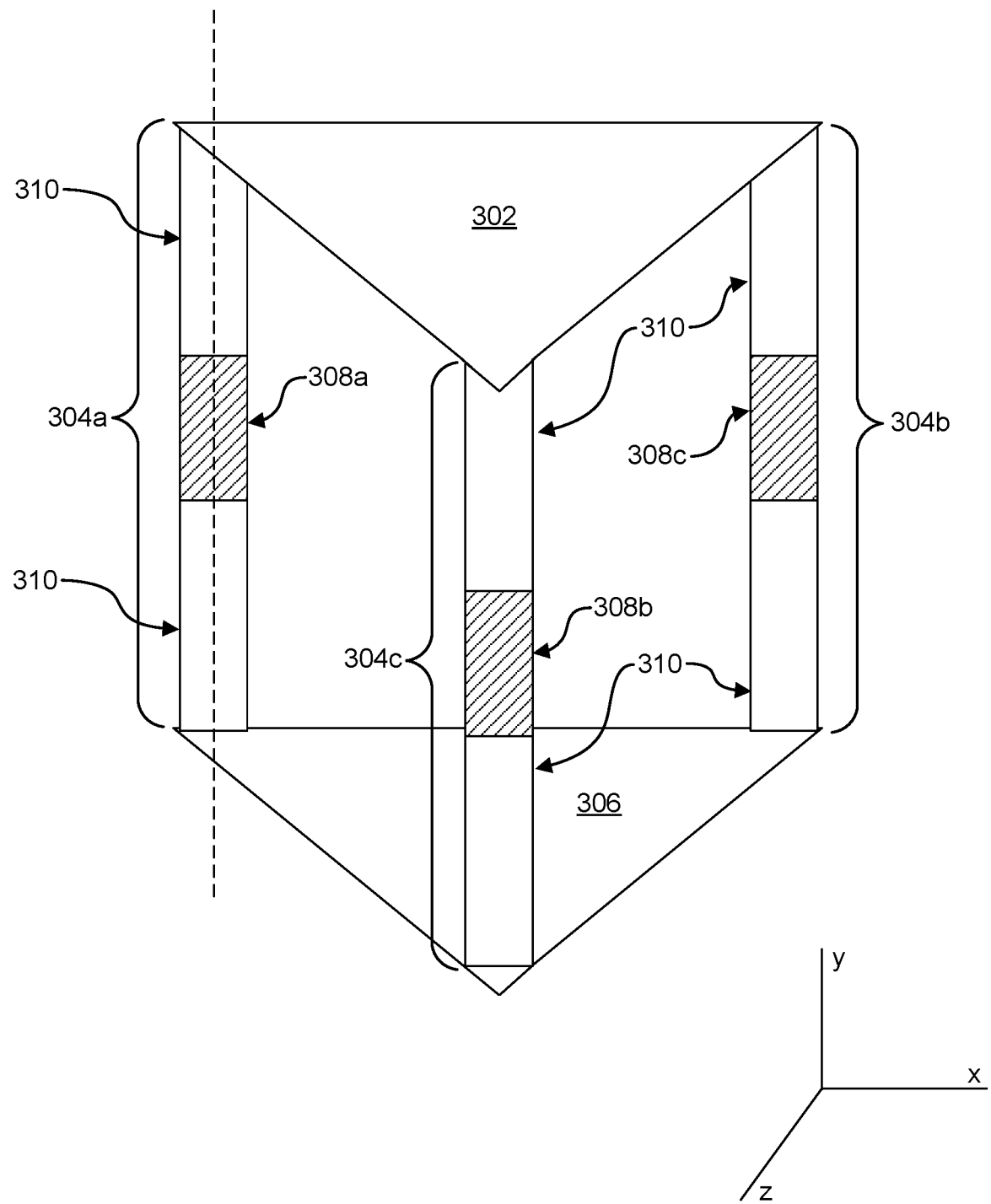
FIG. 3 is an example tactile pixel in accordance with embodiments of the technology disclosed herein.

FIG. 3 is a closer view of an example tactile pixel 206 in accordance with embodiments of the present disclosure. Specifically, FIG. 3 shows the tactile pixel 206 in a fully expanded state, wherein each of the support struts 304*a-c* are fully expanded such that the top plate 302 is at a maximum height (defined by the length of the support struts 304*a-c*) above, and parallel to, the bottom plate 306. Although illustrated as having a distinct bottom plate 306, in various embodiments a plurality of tactile pixels 206 may share a common bottom plate 306. In other words, bottom plate 306 may comprise a surface upon which a plurality of tactile pixels 206 are disposed, such as a common backplate. Referring to FIG. 2, as a non-limiting example, the tactile pixels 206 can be arranged in pixel pairs 212, wherein the tactile pixels 206 of the pixel pair 206 is disposed on a common bottom plate 306 (not shown in FIG. 3). In other embodiments, all of the tactile pixels 206 can be disposed on a common bottom plate 306.

Referring back to FIG. 3, each tactile pixel 206 comprises a plurality of support struts 304. In various embodiments, each tactile pixel 206 may comprise a number of support struts 304 equal to the number of vertices of the top plate 302. As illustrated in FIG. 3, a triangular tactile pixel 206 comprises three support struts 304*a-c*, each of the support struts 304*a-c* connected to a different vertex of the top plate 302. Each support strut 304 comprises a liquid crystal elastomer (LCE) hinge 308 disposed between two rigid portions 310. Each rigid portion 310 comprises a section of the support strut 304 having a fixed structure and shape. As shown in FIG. 3, when the support strut is in its fully expanded state the LCE hinge 308 is in an open position, meaning the centerline of each of the rigid portions 310 and the LCE hinge 308 (represented by the dotted line) are aligned along the y-axis.

Figure 4B:
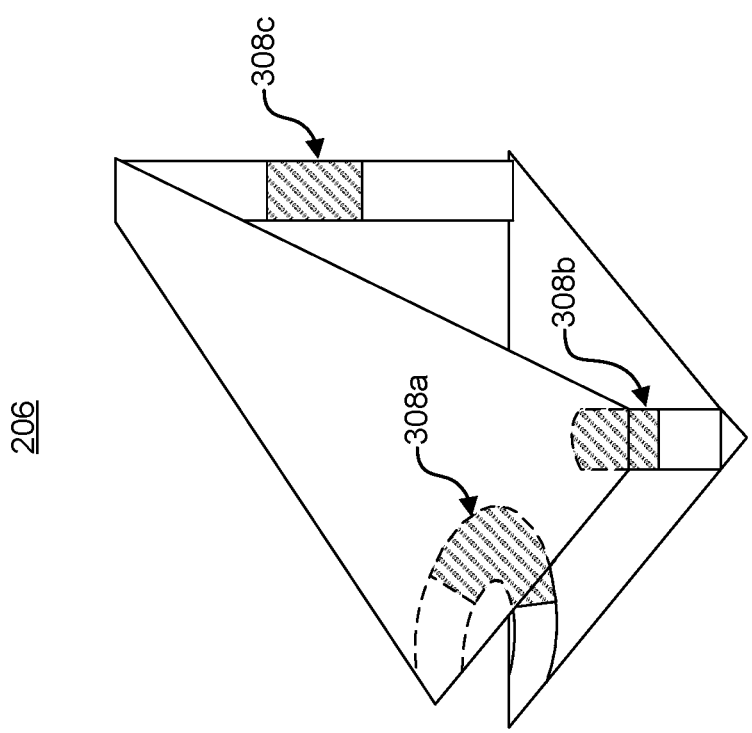
FIG. 4B illustrates the example tactile pixel of FIG. 3 with one support strut in an open state in accordance with embodiments of the technology disclosed herein.
Figure 4A:
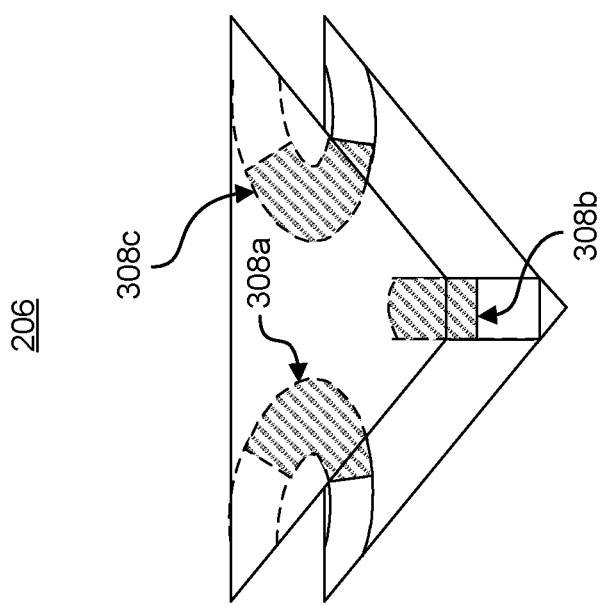
FIG. 4A illustrates the example tactile pixel of FIG. 3 in a compressed state in accordance with embodiments of the technology disclosed herein.

When the support strut 304 is in its fully compressed state the LCE hinge 308 is in a closed position, meaning that the rigid portions 310 are no longer aligned along the y-axis (as shown in FIG. 4A). In various embodiments, when the LCE hinge 308 is in any position other than the open position, the LCE hinge 308 may be in a curved shape resulting in one rigid portion being positioned above the other rigid portion, with the LCE hinge 308 positioned in between. As shown in FIG. 3, the top edge of the LCE hinge 308 is connected to a distal edge of a first rigid portion (with the proximal edge of the first rigid portion being connected to a vertex of the top plate 302) and the bottom edge of the LCE hinge 308 is connected to a distal edge of the second rigid portion (with the proximal edge of the second rigid portion being connected to the bottom plate 306).

In this way, the vertex of the top plate 302 can be set at a variety of different heights. Based on the stimuli applied (or not applied) to the LCE hinge 308, the support strut 304 can be positioned such that the vertex of the top plate 302 can be set at a desired height within the range defined by the position of the vertex of the top plate 302 when the support strut 304 is fully expanded (i.e., the LCE hinge 308 is in the open state) and the position of the vertex of the top plate 302 when the support strut 304 is fully compressed (i.e., the LCE hinge 308 is in the closed state). Only the LCE hinge 308 changes shape and/or size with the application of stimuli, while the rigid portions 310 of the support strut 304 remain unaffected. The change in the positioning of the rigid portions 310 is caused by the change made to the associated LCE hinge 308.

FIGS. 4A and 4B illustrate an example operation of the support struts 304 in accordance with embodiments of the present disclosure. As shown in FIG. 4A, the tactile pixel 206 is in a fully compressed state, meaning that each of the support struts 304*a-c* are in a fully compressed state. In various embodiments, the fully compressed state of the support struts 304*a-c* can be caused by applying a stimuli to the LCE hinges 308*a-c*, respectively, to place the LCE hinges 308*a-c* in the closed state, whereas in other embodiments the compressed state can be achieved by removing stimuli to the LCE hinges 308*a-c*. As shown in FIG. 4B, when stimuli is applied to LCE hinge 308*c*, the support strut 304*c* is placed into the fully extended state, raising the associated vertex of the top plate 302 to its maximum height. Because each LCE hinge 308*a-c* can be independently controlled, only the LCE hinge 308*c* is moved from the closed state to the open state, while the support struts 304*a* and 304*b* remain in the fully compressed state. This causes the top plate 302 to be positioned on an angle relative to the bottom plate 306.

Depending on the implementation, each support strut 304*a-c* can be placed in an intermediate state by applying or removing the stimuli to the LCE hinges 308*a-c*, respectively, wherein the associated vertex is placed at a height other than the lowest height (i.e., compressed state) and the greatest height (i.e., expanded state). Although not shown in FIGS. 4A and 4B, a person of ordinary skill in the art would appreciate the different height positions each vertex can be independently set to. Because each LCE hinge 308*a-c* are operated independently, the plurality of tactile pixels 206 shown in FIG. 2 can be used to form a variety of different shapes corresponding to the visual icon presented on the display (as discussed with respect to FIG. 1). Through the application of a variety of different levels of stimuli to the LCE hinges 308 of the tactile pixels 206, the touchpad 104 can be deformed such that the shape of the visual icon from the display 102 is replicated in physical form in the touchpad 104, making it easier for the use to accurately interact with the visual icon without touching the display 102.

Although the tactile pixel 206 is discussed with respect to this triangular form factor, this should not be interpreted as limiting the scope of the technology to only triangular tactile pixels 206. In other, non-limiting examples, the tactile pixels may be rectangular, hexagonal, pentagonal, square, or any other polygonal shape. In various embodiments, the greater number of vertices of the top plate 302 can be used to increase the resolution of the shapes which a plurality of tactile pixels can take. The greater number of vertices increases the number of deformable support struts 304, allowing for a wider range of top plate 302 positioning.

In various embodiments, a variety of different sensors may be disposed on or embedded within the top plate 302 to provide greater flexibility in implementation. As non-limiting examples, capacitive or resistive sensors can be implemented to allow the system to detect human touch at each tactile pixel 206, similar to a touchscreen. In some embodiments, the use of touch sensors (e.g., capacitive or resistive sensors) on the top plate 302 can enable the touchpad 104 (e.g., the translation region 106) to detect and understand a user's touch without the need for the surface layer 202 to be touch-sensitive. Moreover, because each top plate 302 of each tactile pixel 206 comprises its own touch sensor, the system 100 can more accurately detect the positioning of the user's finger as it moves across the translation region 106. In various embodiments, the positioning of the user's fingers can be determined based on the amount of contact between the user's fingers and the top plate 302 of each tactile pixel 206 having a touch sensor, similar to triangulation of signals.

In some embodiments, other devices may be embedded or otherwise disposed on the top plate 302, such as actuators or other motion devices configured to provide haptic feedback. Non-limiting examples of such motion devices include linear resonant actuators (LRAs), electromechanical regenerative actuators (EMRs), piezoelectric actuators, pneumatic actuators, spring actuators, among others. As a non-limiting example, an actuator may be configured such that, when the user pushes down on an area representing a visual icon, the actuators on the plurality of tactile pixels 206 representing that icon can activate and apply an upward force on the user's finger, giving the sensation of clicking a physical button without depressing all of the tactile pixels 206. In this way, damage to the tactile pixels 206 and the support struts 304 can be minimized by reducing the strain on the LCE hinges 308 possibly caused by a user who expects some resistive force to occur when selecting an icon. In some embodiments, one or more pressure sensors may be disposed on the top plates 302 of the various tactile pixels 206 making up the visual icon, the pressure sensors detecting force applied by a user's finger. Using these pressure readings, the system 100 can determine that the user is intending to select the visual icon and can dynamically change the stimuli to the required LCE hinges 308 of the support struts 304 to allow the top plates 302 to move downward toward the base plates 306, giving the indication to the user that the visual icon is being depressed to select. By changing the positioning of the LCE hinge 308, the indication of depression is provided without causing undue strain on the LCE hinge 308. In some embodiments, the motion devices may be configured to provide a vibrational pattern indicating to the user the presence of an interactive area of the display 102 (as recreated in the translation region 106 of the touchpad 104).

In some embodiments, the top plates 302 may include one or more biometric sensors. Non-limiting examples of biometric sensors include fingerprint readers, pulse sensors, biomarker sensors, electrocardiograms, galvanic skin response sensors, among others. The data collected from the biometric sensors can be used by the system 100 to determine the health and physical status of user's and/or identify users based on known profiles (e.g., using fingerprints, biomarkers, etc.). This information can be used by system 100 to control other vehicle systems without user intervention, such as (as a non-limiting example) adjusting the climate control or air conditioning system to modify the interior temperature if it is detected that the user is sweating excessively through one or more biometric sensors. As another non-limiting example, a user's stress levels can be determined through galvanic skin response captured through associated sensors on one or more of the tactile pixels 206, this information being utilized to adjust various vehicle systems to calm the user down (e.g., turning the volume on the radio down, injecting a smoothing scent into the car through the climate system, adjusting the interior lighting, etc.).

Referring back to FIG. 2, the touchpad 104 can include a bottom layer 208. In various embodiments, the bottom layer 208 can comprise the bottom plate of the tactile pixel 206 of the tactile pixel layer 204. In other embodiments, the bottom plate of the tactile pixels 206 can be disposed on the bottom layer 208. The bottom layer 208 can serve as a support structure for the various components of the touchpad 104. In various embodiments, one or more processors and/or processing circuitry (collectively, processing circuitry 210) can be disposed on the bottom layer 208 and communicatively coupled to the other components of the touchpad 104 discussed above with respect to FIGS. 2-4B. In some embodiments, the processing circuitry 210 may be dedicated to controlling and operating the touchpad 210, while in other embodiments the processing circuitry 210 may comprise circuit components and traces communicatively coupling the components of the touchpad 104 with an ECU or other processing components of the infotainment system 100 and/or the vehicle.

Figure 5A:
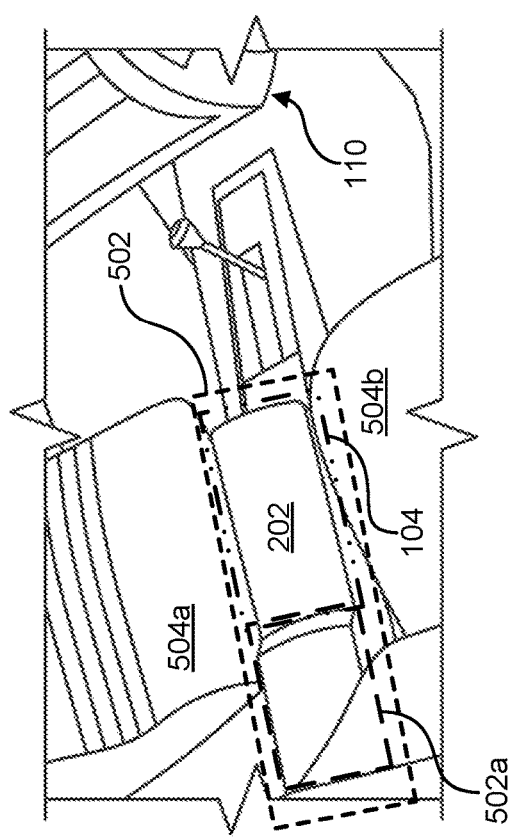
FIG. 5A illustrates an example location of the touchpad within the interior of a vehicle in accordance with embodiments of the technology disclosed herein.

FIG. 5A shows an example location of the touchpad 104 within the interior of a vehicle in accordance with embodiments of the technology disclosed herein. Referring to FIG. 1, the touchpad 104 was not shown in a physical location for ease of identifying and describing the relevant portions of the example system 100. FIG. 5A provides an example physical location of the touchpad 104 to further describe the system 100. As shown in FIG. 5A, the touchpad 104 may be disposed on top of a center console 502. As illustrated, the surface layer 202 of the touchpad 104 may comprise a forward section of the center console 502, with a rear section 502a comprising an arm rest, a lid to a storage area, a combination of both, or any other type of use known in the art for the center console 502. In some embodiments, the touchpad 104 may comprise the entirety of the top of the center console 502 (i.e., the surface layer 202 extends the length of the center console 502), with the touchpad 104 comprising a lid or other movable structure allowing a user access to an area within the interior of the center console 502. Although shown as being disposed in the center console 502, the touchpad 104 may be positioned separate from the center console 502 in other embodiments, including but not limited to being implemented as its own structure disposed between the center console 502 and the dashboard 110, as a separate arm extending from the side of one or both of the occupant seats 504a, 504b, or elsewhere within the vehicle. A person of ordinary skill in the art would understand that the location of the touchpad 104 is not limited solely to the illustrated embodiment of FIG. 5A.

Figure 5B:
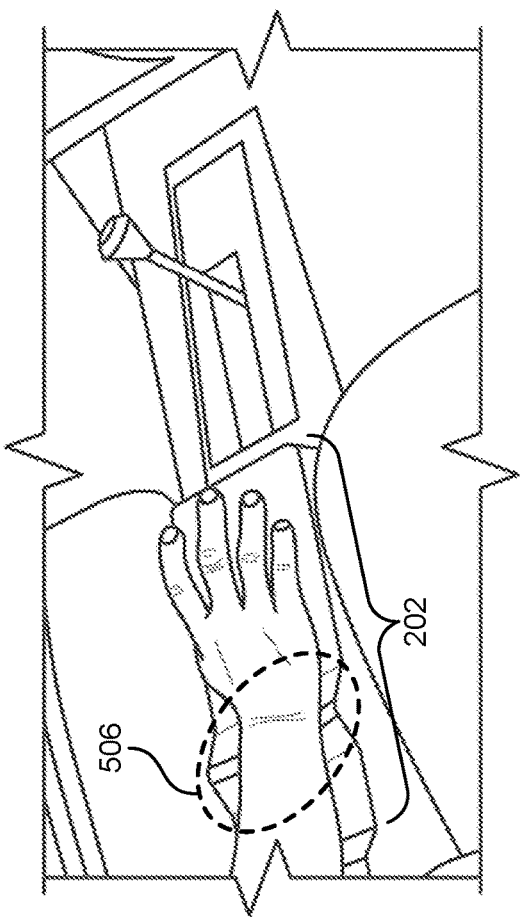
FIG. 5B illustrates an example dynamically adjustable armrest in accordance with embodiments of the technology disclosed herein.

In addition to changing shape to physically represent visual icons from a display 102 in the translation region 106 of the touchpad 104, the tactile pixels 206 enable other uses of the deformable structure. As a non-limiting example, the tactile pixel layer 206 can extend beyond the translation region 106 in various embodiments, allowing the surface of the touchpad 104 to be deformed in areas not associated with the representation of the display 102. FIG. 5B illustrates an example dynamically adjustable armrest implementation in accordance with embodiments of the technology disclosed herein. As shown in FIG. 5B, the surface layer 202 is configured to deform to accommodate the shape and position of the user's wrist area 506. One or more proximity, biometric, pressure, and or other sensors disposed on the tactile pixels 206 of the tactile pixel layer 204 (not shown in FIG. 5B) can determine the placement and shape of the user's wrist area 506 and activate associated LCE hinges to place the tactile pixels in a position corresponding to the detected shape and placement. As shown in FIG. 5B, the tactile pixels can be stimulated to form a U-shape within the surface layer 202 to cradle and support the user's wrist area 506. This way, the tactile pixels are capable of not only representing dynamically the visual icons presented on a display, but can also be used to dynamically adjust the shape of the center console 502 to accommodate for the differences between the shapes of different user's arms.

FIG. 6 illustrates an example architecture for operating a touchpad system 600 in accordance with embodiments of the present disclosure. The touchpad system 600 can be used to control manipulation of the touchpad 104 of the example infotainment system 100 discussed with respect to FIGS. 1-5B. Referring now to FIG. 6, in this example, touchpad system 600 includes a tactile pixel control circuit 610. Tactile pixel control circuit 610 can be implemented as an electronic control unit (ECU), as part of an ECU, or independently of the ECU.

Tactile pixel control circuit 610 in this example includes a communication circuit 601, a decision circuit 603 (including a processor 606 and memory 608 in this example) and a power supply 612. Components of tactile pixel control circuit 610 are illustrated as communicating with each other via a data bus, although other communication in interfaces can be included. In various embodiments, the tactile pixel control circuit 610 can be implemented as the processing circuitry 210 discussed above with respect to FIG. 2.

Processor 606 can include a GPU, CPU, microprocessor, or any other suitable processing system. The memory 608 may include one or more various forms of memory or data storage (e.g., flash, RAM, etc.), and can be made up of one or more modules of one or more different types of memory, and may be configured to store data and other information as well as operational instructions that may be used by the processor 606 to perform the functions of the tactile pixel control circuit 610. In various embodiments, the processor 606 may be configured to execute non-transitory machine readable instructions stored on memory 608 to control the positioning of one or more tactile pixels within the tactile pixel layer of the touchpad to represent the visual icons displayed on a display screen and/or to adjust the shape of the touchpad to accommodate a user's arm or other body part through activation of one or more devices 660 to manipulate the LCE hinges (discussed with respect to FIGS. 3-4B).

Although the example of FIG. 6 is illustrated using processor and memory circuitry, as described below with reference to circuits disclosed herein, decision circuit 603 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a tactile pixel control circuit 610.

Communication circuit 601 can include either or both of a wireless transceiver circuit 602 with an associated antenna 614 and a wired I/O interface 604 with an associated hardwired data port (not illustrated). As this example illustrates, communications with tactile pixel control circuit 610 from sensors 650, devices 660, display 690, or a combination thereof can include either or both wired and wireless communications circuits 601. Wireless transceiver circuit 602 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 614 is coupled to wireless transceiver circuit 602 and is used by wireless transceiver circuit 602 to transmit radio signals wirelessly to wireless equipment with which it is connected and to receive radio signals as well. These RF signals can include information of almost any sort that is sent or received by the tactile pixel control circuit 610 to/from other entities, such as the other components shown in FIG. 6.

Wired I/O interface 604 can include a transmitter and a receiver (not shown) for hardwired communications with other devices. For example, wired I/O interface 604 can provide a hardwired interface to other components of the system. Wired I/O interface 604 can communicate with other devices using Ethernet or any of a number of other wired communication protocols whether standardized, proprietary, open, point-to-point, networked or otherwise.

Power supply 612 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

A plurality of sensors 650 and devices 660 may be utilized to operate the tactile pixels of the touchpad system 600. The tactile pixel control circuit 610 receives data indicating the visual icons being presented on a display 690. In various embodiments, the data may be received from the display 690, while in other embodiments processor 606 may be configured to control the presentation on the display 690 and, therefore, already have knowledge of the visual icons being presented without the need for the tactile pixel control circuit 610 to receive such information from the display 690. Regardless, the tactile pixel control circuit 610 can be configured to use the data regarding what is being presented on the display 690 at a given time to determine how to manipulate the tactile pixels. Depending on the visual icons required to be displayed, the tactile pixel control circuit 610 can determine which of the plurality of tactile pixels are required and, based on the identified shape of each visual icon, how to manipulate the independently-controllable support struts of respective tactile pixel to result in the desired physical representation of the visual icon. In various embodiments, the memory 608 may maintain a database containing configuration data associated with a plurality of known visual icons. In such embodiments, the processor 606 of the decision circuit 603 can access the configuration file associated with a respective visual icon to determine an amount of stimulation, a type of stimulation, and/or which support struts of a given tactile pixel within the respective set of tactile pixels to manipulate in order to achieve the desired physical shape of the visual icon. In other embodiments, the decision circuit 603 can determine in real-time the various configuration parameters needed to present the physical representation of each visual icon within the touchpad.

To manipulate the tactile pixels, the tactile pixel control circuit 610 can operate one or more devices 660 for use in controlling the LCE hinges of the tactile pixels. Devices 660 can include one or more types of actuators configured to apply some type of stimuli to the LCE hinges. As discussed above, the LCE hinges are designed such that one or more characteristics of the material can change with the application of certain stimuli. Non-limiting examples of stimuli include heat, light, current, and pressure (e.g., vacuums). In some embodiments, the LCE hinges may be susceptible to changes based on more than one type of stimuli, with the different stimuli causing different changes in the LCE hinges. A non-limiting example includes a compressor 630, which may be configured to inflate or deflate the LCE hinges through interaction with capillary penetration. For example, when a given support strut is required to be expanded to move the top plate of the tactile pixel into a given position to represent the visual icon, the compressor 630 can be turned on to push a fluid through the capillaries within the LCE hinge to reconfigure the LCE hinge from a closed position to an open or intermediate position. In various embodiments, the fluid can be a liquid or a gas. In some embodiments, the LCE hinge may be configured to take on a particular shape when fluid is added.

The touchpad system 600 may further include a voltage source 632 and/or current source 638. Various soft robotics materials (e.g., LCEs) can be controlled using electrical signals, such as electroactive polymers. By applying electrical signals to the material it can be controlled to take on a variety of characteristics, from varying hardness to different shapes. In embodiments where the respective LCE hinge comprises an electrically-controlled material, voltage source 632 and/or current source 638 can be used to apply the necessary electrical signal to the material. In some embodiments, the power supply 612 can serve as the voltage source 632 and/or the current source 638, while in other embodiments the voltage source 632 and/or the current source 638 may be a battery or other electrical storage device disposed in or near the touchpad. In some embodiments, the voltage source 632 and/or the current source 638 can be associated with all of the tactile pixels, a subset of tactile pixels, or with an individual tactile pixel. In various embodiments, a plurality of voltage sources 632 and/or current sources 638 can be included within the touchpad system 600. When such stimuli is required, the decision circuit 603 can determine to which LCE hinges the electrical signals are to be applied, and the level to be applied to achieve a desired shape of a respective LCE hinge.

Another device 660 that may be used to manipulate the LCE hinges of the support struts of the tactile pixels can be a thermal device 634. Thermal device 634 can be configured to change the temperature of the LCE hinges, causing the characteristics of the material to change. In various embodiments, a thermal device 634 can be disposed on each LCE hinge of the various tactile pixels, while in other embodiments the thermal device 634 can be independent of but communicatively in contact with each LCE hinge (e.g., inductive heating). In various embodiments, each LCE hinge can be associated with a dedicated thermal device 634, in other embodiments all of the LCE hinges of a given tactile pixel may be controlled using a pixel-dedicated thermal device 634, or in still other embodiments a thermal device 634 may be configured to control heat application to a subset of tactile pixels. In some embodiments, a thermal controller may be associated with each tactile pixel, the thermal controller configured to control the application of heat to each LCE hinge of an associated tactile pixel to enable independent operation of the different support struts.

In some embodiments, the LCE hinges may be manipulated through the application of light. In such embodiments, one or more lights 636 can be used to control the LCE hinges. In various embodiments, the lights 636 can be dispersed along the tactile pixel layer. In some embodiments, each light 636 may be configured to control the manipulation of an individual LCE hinge, while in other embodiments a light 636 may be configured to control a plurality of LCE hinges. Non-limiting examples of lights 636 include light emitting diodes (LEDs), organic LEDs (OLEDs), polymer LEDs, laser diode, among others.

In some embodiments, one or more other devices 670 may be included in the touchpad system 600. Such additional devices 670 may be included to provide additional feedback to the user, such as the one or more motion devices discussed above with respect to FIGS. 2-4B.

After the visual icons from the display 690 are physically represented through the manipulation of the tactile pixels, the tactile pixel control circuit 610 can determine how the user is interacting with the display. The tactile pixel control circuit 610 can receive data from one or more sensors 650 in order to determine whether a user has selected a given visual icon. As shown in FIG. 6, sensors 650 can include one or more proximity sensors 620, pressure sensors 622, touch sensors 624, and/or biometric sensors 626. In some embodiments, additional sensors may be included. Proximity sensors 620 can comprise one or more sensors designed to detect when a user's hand, arm, or finger is approaching the touchpad surface. Non-limiting examples of proximity sensors include capacitive sensors, capacitive displacement sensors, radar, LIDAR, infrared (IR) sensors, ultrasound sensors, capacitance sensors, sweat sensors, and hall effect sensors, among others. In various embodiments, a plurality of proximity sensors 620 can be used. Data collected by the one or more proximity sensors 620 can be communicated to the tactile pixel control circuit 610 through the communications circuit 601 for use by the decision circuit 603 in determining when a user is interacting with the touchpad.

In various embodiments, pressure sensors 622 can be used to determine whether a user is applying pressure to one or more tactile pixels. The tactile pixel control circuit 610 can utilize this information to determine that a user is selecting or otherwise interacting with a visual icon represented by the manipulated tactile pixels. In various embodiments, the tactile pixel control circuit 610 can determine to activate one or more other devices 670, such as (but not limited to) the motion devices discussed above with respect to FIGS. 3-4B to provide a haptic indication to the user that the icon is being selected. In some embodiments, the tactile pixel control circuit 610 can use the data from the pressure sensors 622 to determine a change in the stimulation applied to a set of LCE hinges to allow the tactile pixels representing the visual icon to compress, given the haptic feeling that the user is pushing down on a physical button. In various embodiments, the pressure sensors 622 can also be used by the tactile pixel control circuit 610 to determine that a person's arm or wrist is in contact with the touchpad and, accordingly, determine how to manipulate the tactile pixels to deform the surface of the touchpad to provide support for the person's arm or wrist, as discussed with respect to FIGS. 5A and 5B.

As discussed above, touch sensors 624 may be disposed on or in the top plate of each tactile pixel to enable individual detection of a user's finger or other body part (e.g., palm, wrist, etc.). In various embodiments, touch sensors 624 disposed on tactile pixels within a translation region (e.g., translation region 106) can be configured with greater sensitivity to those touch sensors 624 disposed on other, non-translation region tactile pixels. In some embodiments, one or more biometric sensors 626 may be included in the touchpad system 600. Biometric sensors 626 may be utilized in determining and identity and/or physical condition of a user, as discussed above with respect to FIGS. 2-4B. In various embodiments, one or more of the touch sensors 624, pressure sensors 622, proximity sensors 620, and/or biometric sensors 626 may be combined into a single sensor. In various embodiments, one or more of the sensors 650 and devices 660 may be disposed on the bottom surface 208 of the touchpad 104 as discussed above with respect to FIG. 2 and configured to operate the tactile pixels 206.

Figure 7A:
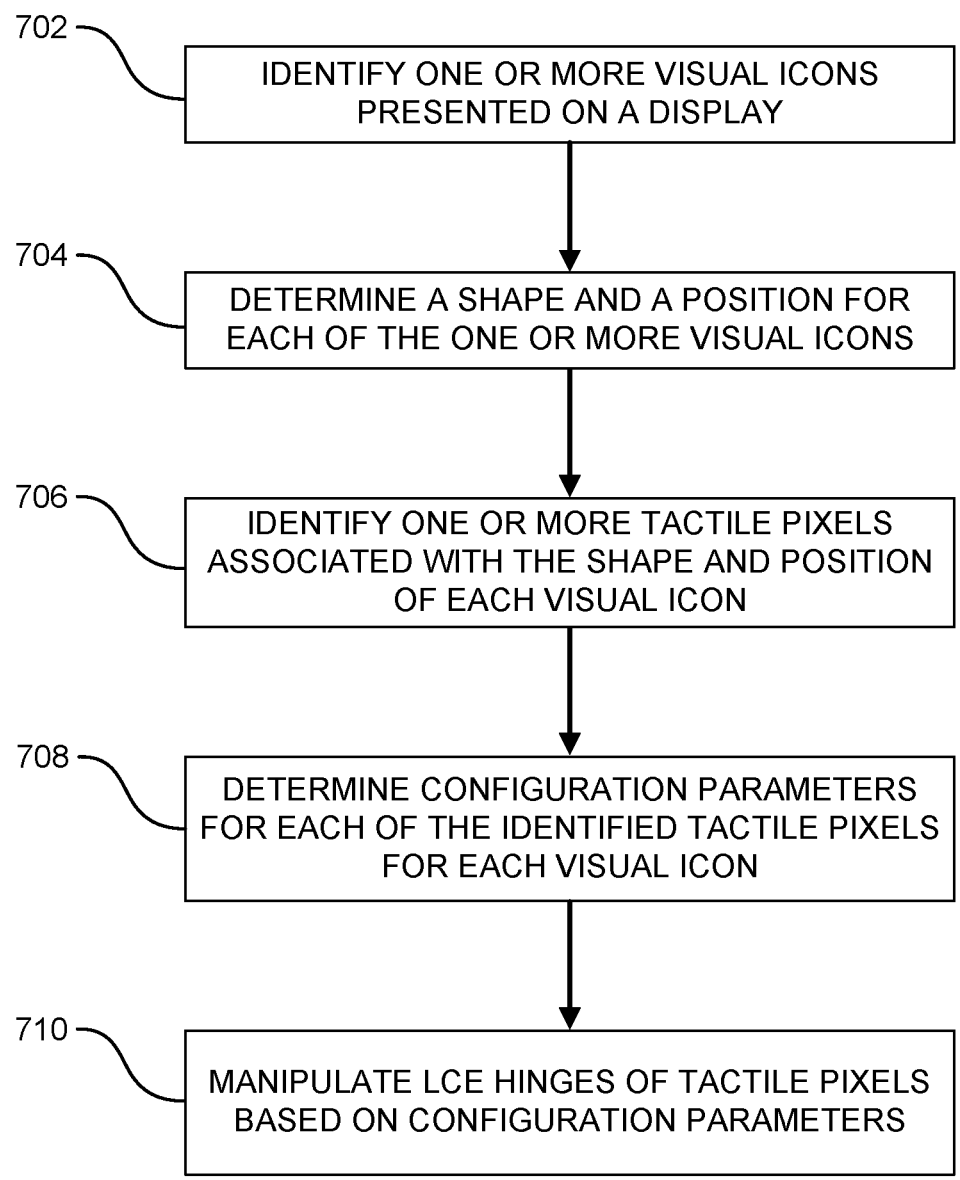
FIG. 7A shows an example method in accordance with embodiments of the technology disclosed herein.
Figure 7B:
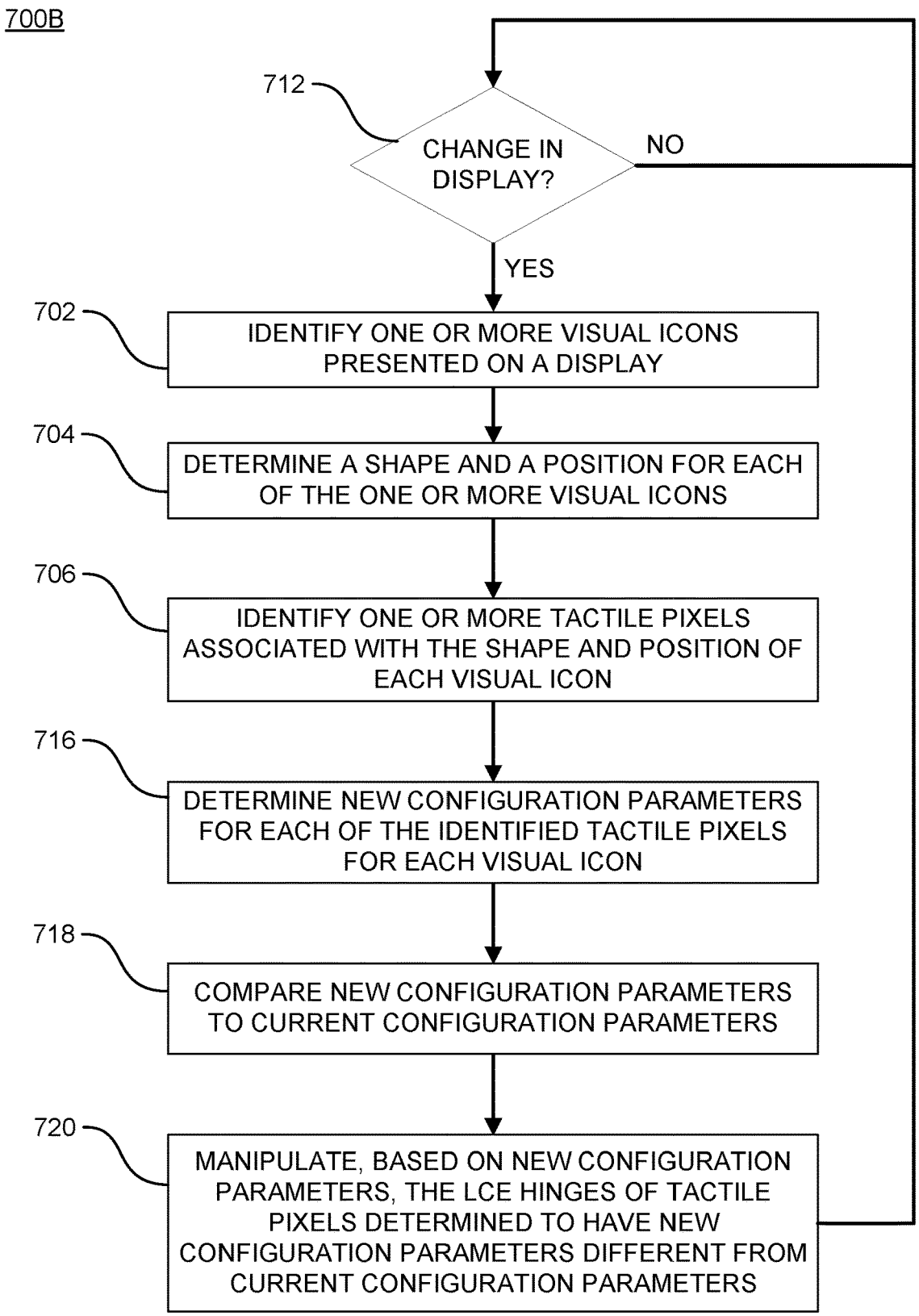
FIG. 7B shows another example method in accordance with embodiments of the technology disclosed herein.
Figure 7C:
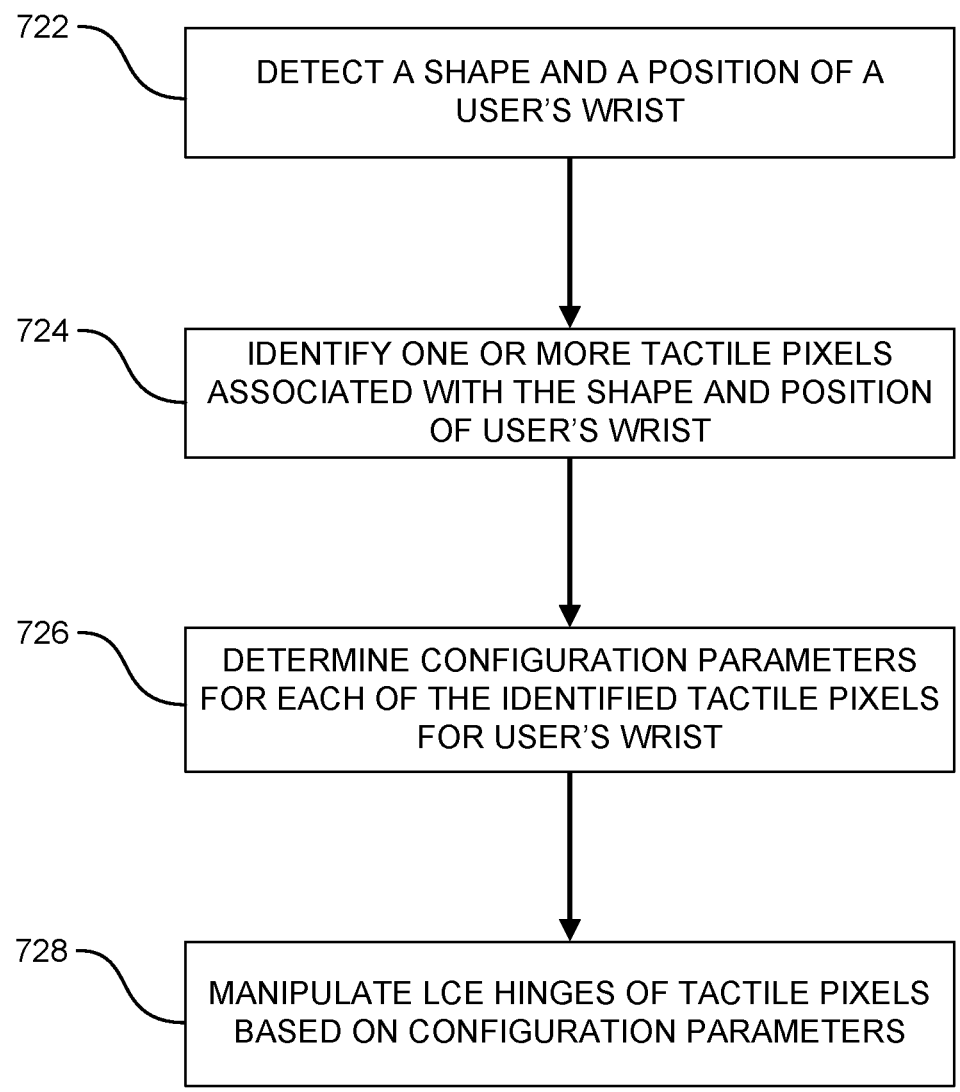
FIG. 7C shows another example method in accordance with embodiments of the technology disclosed herein.

FIGS. 7A-7C are example methods 700A-700C, respectively, for operating a touchpad system in accordance with embodiments of the present disclosure. The methods 700A-700C can be used with respect to the example systems 100 and 600 discussed with respect to FIGS. 1-6 above. Methods 700A-700C are provided for illustrative purposes only and should not be interpreted as limiting the scope of the present disclosure to only the discussed embodiments. The example methods 700A-700C can be stored in non-transitory machine readable storage media (e.g., memory 608) and executable by a processor (e.g., processor 606).

FIG. 7A illustrates an example method 700A for presenting a physical representation of a visual icon from a display in accordance with embodiments of the technology disclosed herein. At operation 702, a processor (e.g., processor 606) can identify one or more visual icons presented on a display. In various embodiments, the processor may obtain data defining the visual representation on the display over a communication circuit, such as communication circuit 601 discussed with respect to FIG. 6 above. In some embodiments, the processor may be configured to control the display as well as a touchpad and/or tactile pixels of systems, such as systems 100 and 600 discussed with respect to FIGS. 1-6 above.

After identifying the one or more visual icons, the processor can determine a shape and a position for each of the identified one or more visual icons at operation 704. As discussed above, a physical representation of the visual icons can be presented within a translation region of the touchpad to provide enhanced haptic feedback and control of vehicle systems through an interface, such as example infotainment system 100 discussed above. Each of the visual icons may have any shape consistent with a given implementation, including but not limited to squares, triangles, circles, hexagons, or any other polygonal shape. Determining the position for each of the visual icons can comprise identifying a set of coordinates within the display that define the determined shape for the respective visual icon. Determining the position can further comprise translating the identified set of coordinates into a scaled set of coordinates, the scaled set of coordinates defining a scaled size of the visual icon based on the size of the translation region of the touchpad. As a non-limiting example, where the display screen is double the size of the translation region, the scaled set of coordinates can be translated such that the resulting representation of the visual icon in the translation region represents a half-size version of the visual icon.

After determining the shape and position for each visual icon, the processor can identify one or more tactile pixels associated with the determined shape and position of each visual icon at operation 706. As discussed above with respect to FIGS. 1-6, the touchpad can comprise a tactile pixel layer having a plurality of tactile pixels. The position and shape of each visual icon within the translation region can encompass one or more tactile pixels. Identifying the set of tactile pixels for each visual icon enables the processor to determine configuration parameters for each of the tactile pixels included in the set to represent each visual icon in the translation region at operation 708. In various embodiments, configuration parameters for each tactile pixel can identify an amount of stimuli to apply to the LCE hinge of each support strut such that each vertex of the top plate is positioned at the proper height for the portion of the visual icon represented by the given tactile pixel. Based on the determined configuration parameters, the processor can manipulate the LCE hinges of the tactile pixels at operation 710. In various embodiments, manipulating the LCE hinges can comprise activating one or more devices configured to apply stimuli to one or more LCE hinges, such as the devices 660 discussed above with respect to FIG. 6.

In various embodiments, method 700A can be performed during an initialization phase, such as when a display is first turned on. In other words, method 700A can be used to place the touchpad into a first representation of the visual display from a default state. The default state may comprise all of the tactile pixels being in a fully compressed state (i.e., all the LCE hinges of the tactile pixels in a closed state) in some embodiments, while in other embodiments one or more of the tactile pixels can be positioned in an intermediate state associated with a non-initialized state. As a non-limiting example, the default state could include the tactile pixels within the translation region of the touchpad being set to an extended state. The default state can be determined based on a given implementation.

FIG. 7B illustrates an example method 700B for modifying a physical representation of a touchpad in accordance with embodiments of the technology disclosed herein. For ease of discussion, method 700B is discussed with the assumption that the display is powered on and showing one or more visual icons at a time before decision 712. Although discussed with this assumption, the description should not be interpreted as limited only to embodiments operating under that assumption. A person of ordinary skill in the art would understand that the method 700B of FIG. 7B can be implemented as an initialization process, similar to method 700A, in various embodiments.

At decision 712, a processor controlling a touchpad system in accordance with embodiments of the technology disclosed herein can decide whether a change in a visual display has occurred. In various embodiments, the processor may be configured to continually monitor the visual representation presented on a display, while in other embodiments the processor may be configured to receive an indication from the display that a change in the visual display has occurred. If no change is detected, the method 700B can loop back to determine if a change has been detected. If a change is detected, method 700B can move on to operation 702. Operations 702-706 may be the same as the operations 702-706 discussed with respect to FIG. 7A. After operation 706, the processor can determine new configuration parameters for each identified tactile pixels for each visual icon at operation 716. In various embodiments, operation 716 can be performed in a similar manner as that of operation 708 discussed with respect to FIG. 7A.

After the new set of configuration parameters are determined at operation 716, the new configuration parameters can be compared with the current configuration parameters at operation 718. The current configuration parameters can be stored in a memory associated with or accessible by the processor, such as memory 608 discussed above with respect to FIG. 6. In various embodiments, comparing the configuration parameters can comprise retrieving the current configuration parameters from a location in non-transitory memory. The comparison may comprise comparing the new and the current configuration parameters for each LCE hinge of a give tactile pixel to see if the change in the display requires a change in the positioning of the LCE hinge.

Based on the comparison, the processor can manipulate the LCE hinges of tactile pixels at operation 720. In various embodiments, the processor may manipulate only those LCE hinges determined to have new configuration parameters different from the current configuration parameters. The manipulation of the LCE hinges can be performed in a manner similar to that of operation 710 discussed with respect to FIG. 7A.

As discussed above, the technology disclosed herein can be used not only to provide a physical representation of a visual presentation of a display, but can also be used to dynamically deform the touchpad surface to accommodate a user's anatomy (e.g., wrist, elbow, etc.). FIG. 7C illustrates an example method 700C to deform the touchpad surface in accordance with embodiments of the technology disclosed herein. For ease of discussion, the method 700C is described with respect to changing the shape of the touchpad surface to accommodate a user's wrist, however (as discussed above with respect to FIGS. 5A-5B), the technology can be used to accommodate other parts of the user's anatomy. Moreover, a person of ordinary skill in the art would understand that the technology disclosed herein can be used to dynamically adjust the shape of the touchpad surface to accommodate the shape and position of any non-anatomy-related item, including but not limited to a cup, mug, watch, or other item. Nothing in this specification should be interpreted as limiting the scope of the technology to only the discussed embodiment. The operations of example 700C may be performed in a manner similar to those discussed with respect to method 700A of FIG. 7A.

As illustrated in FIG. 7C, at operation 722 a processor can detect the shape and position of a user's wrist. One or more sensors can be used to detect the shape and position of the user's wrist. In various embodiments, the one or more sensors can comprise the sensors 630 discussed with respect to FIG. 6, one or more sensors disposed within the interior of the vehicle (including but not limited to cameras), or a combination thereof. In various embodiments, detecting the shape and position of the user's wrist can comprise determining a set of coordinates defining the shape and position of the user's wrist. Unlike the coordinates that may be determined at operation 704 of method 700A, the set of coordinates determined at operation 722 can be based directly on the dimensions of the touchpad surface, instead of being a set of coordinates associated with the display or a smaller portion of the touchpad surface.

At operation 724, the processor can identify one or more tactile pixels associated with the shape and position of the user's wrist. Similar to the visual icons, the detected shape and position of the user's wrist may correspond to one or more tactile pixels disposed within the tactile pixel layer of the touchpad system. In various embodiments, the tactile pixels identified can comprise any tactile pixels within the tactile pixel layer. After identifying the relevant tactile pixels, the processor can determine the configuration parameters for each of the identified tactile pixels associated with the user's wrist at operation 726. Determining the configuration parameters can be performed in a manner similar to determining configuration parameters discussed with respect to operations 708 and 716 of methods 700A and 700B, respectively. Based on the determined configuration parameters, the processor can manipulate the LCE hinges of the tactile pixels at operation 728. Manipulating the LCE hinges may be performed in a manner similar to operation 710 of method 700A discussed with respect with FIG. 7A.

In various embodiments, the processor can continually monitor the shape and position of the user's wrist to enable for dynamic deformation of the touchpad surface. When a change of shape or position is detected, the processor can perform operations (not shown in FIG. 7C) similar to operations performed in method 700B discussed with respect to FIG. 7B.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 8. Various embodiments are described in terms of this example-computing component 800. After reading this description, it will become apparent to a person skilled in the relevant art how to implement the application using other computing components or architectures.

Referring now to FIG. 8, computing component 800 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, portable computing devices, and other electronic devices that might include some form of processing capability.

Computing component 800 might include, for example, one or more processors, controllers, control components, or other processing devices. This can include a processor, and/or any one or more of the components making up the systems 100 and/or 600. Processor 804 might be implemented using a general-purpose or special-purpose processing engine such as, for example, a microprocessor, controller, or other control logic. Processor 804 may be connected to a bus 802. However, any communication medium can be used to facilitate interaction with other components of computing component 800 or to communicate externally.

Computing component 800 might also include one or more memory components, simply referred to herein as main memory 808. For example, random access memory (RAM) or other dynamic memory, might be used for storing information and instructions to be executed by processor 804. Main memory 808 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid-state drive, a magnetic tape drive, an optical drive, a compact disc (CD) or digital video disc (DVD) drive (R or RW), or other removable or fixed media drive might be provided. Storage media 814 might include, for example, a hard disk, an integrated circuit assembly, magnetic tape, cartridge, optical disk, a CD or DVD. Storage media 814 may be any other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot. Other examples may include a PCMCIA slot and card, and other fixed or removable storage units 822 and interfaces 820 that allow software and data to be transferred from storage unit 822 to computing component 800.

Computing component 800 might also include a communications interface 824. Communications interface 824 might be used to allow software and data to be transferred between computing component 800 and external devices. Examples of communications interface 824 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 824 may be carried on signals, which can be electronic, electromagnetic (which includes optical) or other signals capable of being exchanged by a given communications interface 824. These signals might be provided to communications interface 824 via a channel 828. Channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A touchpad apparatus comprising:
a bottom layer comprising processing circuitry;
a tactile pixel layer disposed on top of the bottom layer, the tactile pixel layer comprising a plurality of tactile pixels, wherein the processing circuitry is configured to control operation of the plurality of tactile pixels through application of stimuli to each tactile pixel and each tactile pixel is independently operable; and
a surface layer disposed on top of the tactile pixel layer, the surface layer comprising a deformable material,
wherein each tactile pixel comprises:
a top plate comprising a plurality of vertices; and
a support strut coupled to each vertex of the plurality of vertices, each support strut comprising a liquid crystal elastomer (LCE) hinge disposed between a first rigid portion and a second rigid portion such that the application of stimuli to the LCE hinge of the tactile pixel enables the tactile pixel layer to be deformed, by the processing circuitry, such that the tactile pixels corresponding to a physical shape of a visual icon are repositioned to replicate the visual icon in physical form on the touchpad based on changes in a visual presentation of the visual icon on a display.

2. The touchpad apparatus of claim 1, wherein the deformable material comprises a touch-sensitive material.

3. The touchpad apparatus of claim 2, wherein the top plate comprises one or more motion devices.

4. The touchpad apparatus of claim 3, wherein the one or more motion devices comprises a linear resonant actuator (LRA), an electromechanical regenerative actuator (EMR), a piezoelectric actuator, a pneumatic actuator, a spring actuator.

5. The touchpad apparatus of claim 3, wherein the one or more motion devices are configured to apply a force upward on a finger of a user when the user applies a force downward on the tactile pixel.

6. The touchpad apparatus of claim 2, wherein the top plate comprises one or more biometric sensors.

7. The touchpad apparatus of claim 1, wherein the deformable material comprises a non-touch-sensitive material.

8. The touchpad apparatus of claim 7, wherein the top plate comprises one or more touch sensors configured to detect a finger of a user.

9. The touchpad of claim 1, wherein the processing circuitry is communicatively coupled to and configured to control one or more sensors and one or more devices to cause the plurality of tactile pixels to create a physical representation of one or more visual icons displayed on a display in communication with the touchpad apparatus.

10. The touchpad apparatus of claim 9, wherein the processing circuitry is configured to determine a type and an amount of stimuli to apply to each LCE hinge of a subset of tactile pixels to create the physical representation.

11. The touchpad apparatus of claim 9, wherein each visual icon being displayed on the display is associated with a different subset of tactile pixels of the plurality of tactile pixels.

12. The touchpad apparatus of claim 1, wherein the surface layer comprises:
a translation region configured to create a physical representation of a visual representation projected on a display; and
a dynamically adjustable armrest region configure to conform to an anatomy of an arm of a user.

13. A method comprising:
identifying, by a processing circuitry of an infotainment system, one or more visual icons presented on a display;
determining, by the processing circuitry, a shape and a position for each visual icon of the one or more visual icons;
identifying, by the processing circuitry, one or more tactile pixels associated with the shape and position of each visual icon;
determining, by the processing circuitry, configuration parameters for each identified tactile pixel associated with each visual icon, the configuration parameters comprising a type and an amount of stimuli to apply to each liquid crystal elastomer (LCE) hinge of each identified tactile pixel of the one or more tactile pixels associated with each visual icon; and
manipulating, by the processing circuitry, one or more LCE hinges of each identified tactile pixel for each visual icon based on the determined configuration parameters, manipulating comprising applying the determined stimuli to the one or more LCE hinges of each identified tactile pixel such that the application of the determined stimuli to the one or more LCE hinges enable a touchpad of the infotainment system to be deformed such that the shape of each visual icon is replicated in physical form; and
manipulating, by the processing circuitry, the one or more LCE hinges of respective tactile pixels associated with one or more new visual icons on the display such that the respective tactile pixels are repositioned to replicate the one or more new visual icons in physical form on the touchpad of the infotainment system based on a change in a visual representation projected on the display to the one or more new visual icons.

14. A method comprising:
identifying, by a processing circuitry of an infotainment system, one or more visual icons presented on a display;
determining, by the processing circuitry, a shape and a position for each visual icon of the one or more visual icons;
identifying, by the processing circuitry, one or more tactile pixels associated with the shape and position of each visual icon;
determining, by the processing circuitry, configuration parameters for each identified tactile pixel associated with each visual icon, the configuration parameters comprising a type and an amount of stimuli to apply to each liquid crystal elastomer (LCE) hinge of each identified tactile pixel of the one or more tactile pixels associated with each visual icon; and
manipulating, by the processing circuitry, one or more LCE hinges of each identified tactile pixel for each visual icon based on the determined configuration parameters, manipulating comprising applying the determined stimuli to the one or more LCE hinges of each identified tactile pixel such that the application of the determined stimuli to the one or more LCE hinges enable a touchpad of the infotainment system to be deformed such that the shape of each visual icon is replicated in physical form;

determining if a change has occurred in a visual representation projected on the display;

in response to determining a change has occurred, identifying one or more new visual icons on the display;

determining a shape and a position for each new visual icon of the one or more new visual icons;

identifying one or more new tactile pixels associated with the shape and the position of each new visual icon;

determining new configuration parameters for each identified new tactile pixel associated with each new visual icon;

comparing the new configuration parameters with the configuration parameters before the change occurred to determine if the new configuration parameter for each identified new tactile pixel differs from the configuration parameters for a respective tactile pixel before the change occurred; and in response to determining a difference between the new configuration parameters and the configuration parameters before the change occurred for the respective tactile pixel, manipulating one or more LCE hinges of the respective tactile pixel based on the new configuration parameters.

15. A tactile pixel comprising:

a top plate comprising a plurality of vertices;

a plurality of support struts, each support strut coupled to a different one of the plurality of vertices of the top plate, wherein each support strut comprises:

a first rigid portion and a second rigid portion; and a liquid crystal elastomer (LCE) hinge disposed between a first rigid portion and a second rigid portion, each LCE hinge being independently controllable by applying a type and an amount of stimuli to the LCE hinge to move the LCE hinge from a first position to a second position such that the application of the type and the amount of stimuli to the LCE hinge enables a touchpad to be deformed to replicate a physical shape of a visual icon in a physical form on the touchpad based on changes in a visual presentation of the visual icon on a display.

16. The tactile pixel of claim 15, wherein each LCE hinge is capable of changing a shape in a range from the first position to the second position based on the amount of stimuli applied.

17. The tactile pixel of claim 15, wherein the top plate comprises one or more touch sensors configured to detect a finger of a user.

18. The tactile pixel of claim 15, wherein the top plate comprises one or more motion devices.

19. The tactile pixel of claim 15, wherein the one or more motion devices comprises a linear resonant actuator (LRA), an electromechanical regenerative actuator (EMR), a piezoelectric actuator, a pneumatic actuator, a spring actuator.

20. The tactile pixel of claim 15, wherein the top plate comprises one or more biometric sensors.

* * * * *